C. V. POLLOCK.
GAS MIXER.
APPLICATION FILED APR. 14, 1910.
996,136.
Patented June 27, 1911.
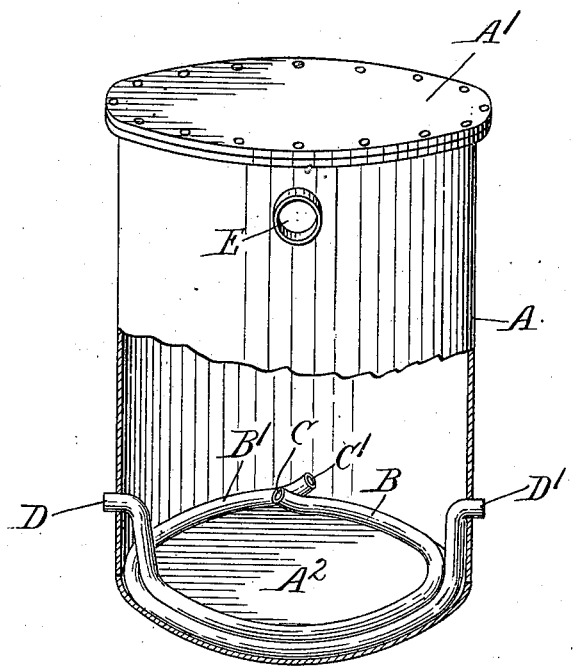
Witnesses,
Edward T. Wray.
Minnie M. Lindenau
Inventor.
Charles V. Pollock.
by Parker & Carter
Attorneys.

ved with discharge opening near the top,
UNITED STATES PATENT OFFICE.

CHARLES V. POLLOCK, OF MADISON, WISCONSIN.

GAS-MIXER.

996,136. Specification of Letters Patent. Patented June 27, 1911.

Application filed April 14, 1910. Serial No. 555,476.

*To all whom it may concern:*

Be it known that I, CHARLES V. POLLOCK, a citizen of the United States, residing at Madison, in the county of Dane and State of Wisconsin, have invented a certain new and useful Improvement in Gas-Mixers, of which the following is a specification.

My invention relates to gas mixers and is illustrated in the accompanying drawing which shows an elevation in part section.

The cylindrical casing A has the top $A^1$ and bottom $A^2$ and contains coiled about the bottom the pipes B, $B^1$ which have the nozzles C, $C^1$ upwardly inclined tangentially to the casing and in communication with the intake openings D, $D^1$ through which gas may be introduced from any suitable generating means not shown, and the mixture discharge opening E near the top of the casing.

It will be evident that while I have shown an operative device, still many changes might be made without departing materially from the spirit of my invention, and the drawing should therefore be regarded as diagrammatic.

The use and operation of my invention are as follows: The gases to be mixed are led into the mixing tank through the two coiled pipes and since these pipes are located at the bottom and as near as possible to the casing and have openings upwardly inclined tangential to the casing, the column of gas from each pipe will be given a more or less spiral motion about the periphery of the tank. There will then be two opposing columns of gas traveling about the tank in opposite directions. These columns will interfere with each other and set up eddy currents and by this means a thorough mixing of the gases will be had and the mixed gas may then be drawn off through the opening in the top of the tank.

I claim:

1. A gas mixing device comprising a cylindrical tank closed at both ends and provided with discharge opening near the top, with a plurality of pipes coiled about the bottom of the tank and having nozzles upwardly inclined tangential to the periphery of the tank.

2. A gas mixing device comprising a cylindrical tank provided with a discharge near the top thereof, with inlet pipes which are coiled within the tank and discharge upwardly near the inner wall of the tank and in opposite directions.

CHARLES V. POLLOCK.

Witnesses:
ISABELLE FLECKENSTEIN,
CHARLES G. RILEY.

---

Copies of this patent may be obtained for five cents each, by addressing the "Commissioner of Patents, Washington, D. C."